Figure 1:
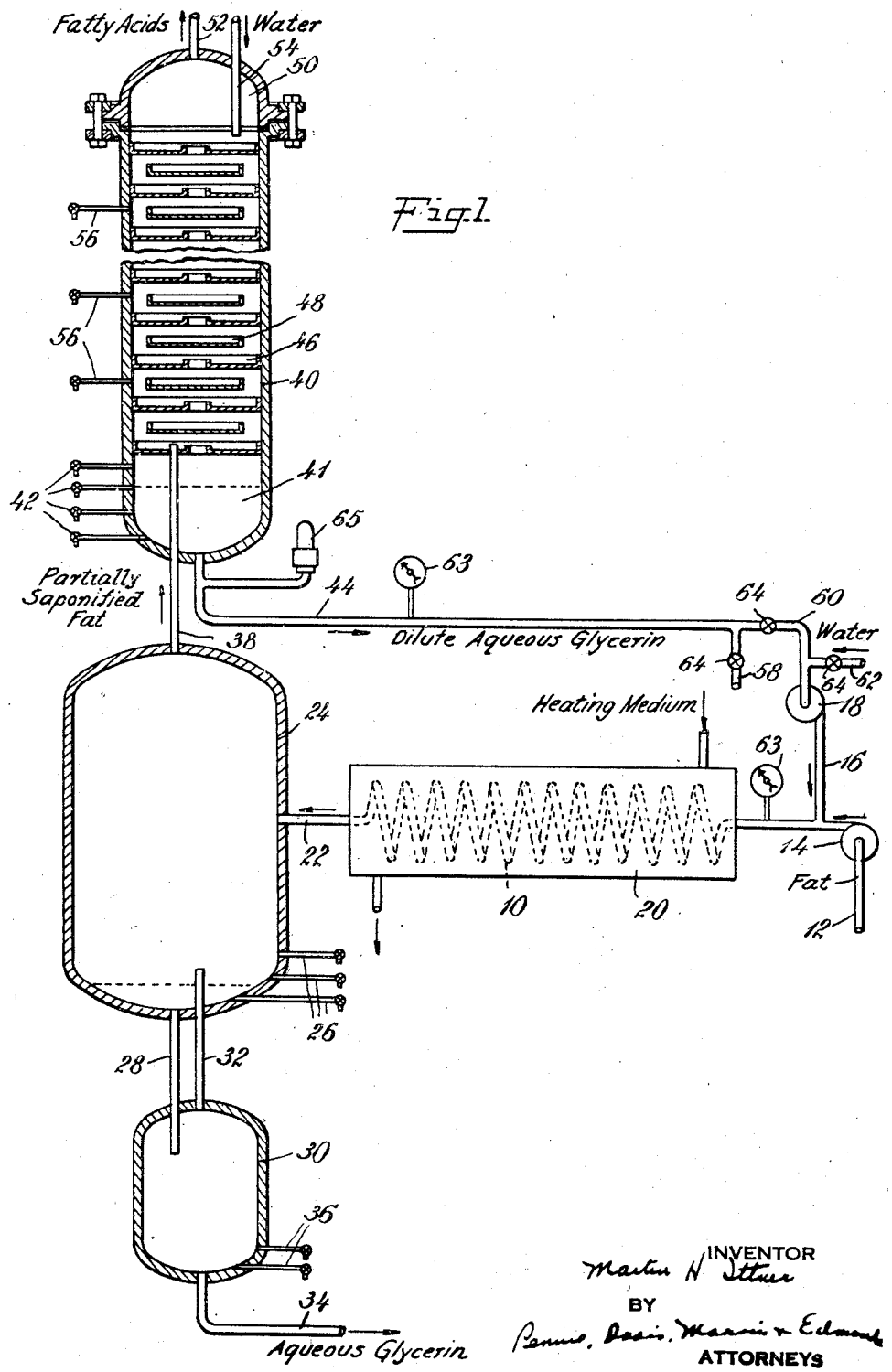

Patented Nov. 19, 1940

2,221,799

UNITED STATES PATENT OFFICE 2,221,799

SAPONIFICATION OF FATS AND OILS

Martin H. Ittner, Jersey City, N. J., assignor to Colgate-Palmolive-Peet Company, Jersey City, N. J., a corporation of Delaware Application April 22, 1937, Serial No. 138,311

26 Claims. (Cl. 260—415)

This invention relates to an improved process and apparatus for the aqueous saponification or hydrolysis of fats and fatty oils to produce fatty acids and glycerin.

It is an object of the present invention to provide an improved process and apparatus for splitting or hydrolyzing fats and fatty oils, which are largely triglycerides, into fatty acids and glycerin, with the production of aqueous glycerin and relatively pure fatty acids uncontaminated by decomposition products or tars or by catalytic materials or reaction products of catalytic materials.

It has been proposed heretofore to accomplish the aqueous hydrolysis of fats and fatty oils by heating the fats or fatty oils together with liquid water at comparatively high temperatures, and at pressures sufficient to prevent the formation of steam in contact with the mixture being heated, with the production of an aqueous solution of glycerin and fatty acids. Usually in such processes, a small amount of a catalyst, such as lime, magnesia, or other basic material, or sulfuric acid or other acid, or the so-called Twitchell reagents, has been used to accelerate the reaction, although processes in which no catalyst is used but in which the saponification or hydrolysis is used but in which the saponification or hydrolysis is effected by water alone have been proposed or used to some extent.

In general, such processes as have been used or proposed heretofore result in balanced reactions which go to equilibria, and the saponification or hydrolysis is incomplete, except with repetitions of the treatment. In such processes, the saponification or hydrolysis seldom proceeds as far as 90% completion, except under extremely favorable conditions. By removing the aqueous solution of glycerin formed and subjecting the fatty matter to repetitions of the treatment, the saponification or hydrolysis may be brought up to 95% of completion, or, under favorable conditions, somewhat higher.

It has been proposed to carry out these processes of aqueous saponification or hydrolysis in several different ways, as by agitating the fat or fatty oils with water in an autoclave at high temperatures and pressures, or by passing the water and fat or fatty oil concurrently through a tube or coil. Such methods of carrying out the saponification or hydrolysis are, of course, equivalent in that they all result in the balanced reaction tending to go to an equilibrium, and the same degree of saponification is obtained by these various modifications of these processes provided the proportions of materials, the temperatures and the pressures are the same and sufficient time is allowed to reach an equilibrium.

As an illustration of the fact that these hydrolyses or saponifications as commonly carried out are balanced or reversible reactions which do not go to completion even at high temperatures and pressures, I have determined that if a mixture containing 35 parts of pure neutral tallow and 25 parts of pure water is heated under pressure in an autoclave to about 255° C. for about 3 hours, or until an equilibrium is reached, a product is obtained which is about 92% hydrolyzed. If a mixture containing glycerin and pure tallow fatty acids, in the exact amounts which would be obtained by complete hydrolysis of 35 parts of pure neutral tallow, and sufficient water to make the total 60 parts is heated in an autoclave to 255° C. for 3 hours and at the same pressure as employed in the test described above, an esterification takes place with the formation of glycerides and with the production of a mixture about 92% hydrolyzed. Thus the same equilibrium is arrived at whether neutral tallow and water are heated together, or whether tallow fatty acids, glycerin and water are heated together. Similar experiments with cocoanut oil indicate that the same phenomenon occurs, except that a larger proportion of water is required for the same degree of hydrolysis. At lower temperatures and pressures, longer periods are required for the reaction to reach an equilibrium point, and at equilibrium the hydrolysis is considerably less.

When such processes are modified by the addition of catalysts, the final equilibrium reached is not materially affected, as the catalysts merely cause the reaction to reach the equilibrium in a shorter period of time.

In my prior application Serial No. 83,991 filed June 6, 1936, I have described a process for the aqueous saponification of fats and fatty oils which results in substantially complete aqueous saponification. In the process therein described, the fat or fatty oil is brought into countercurrent contact with liquid water at temperatures around 250° C. and pressures sufficient to maintain the aqueous phase in a liquid state. In said process, the essential limiting conditions are the use of temperatures sufficiently high so that the solubility of the water in the fatty material is in excess of the amount required for complete saponification but below the temperature at which the fatty material and the water tend to merge into a single phase, that is, in general below about 287° C. and the use of pressures above the pressure of saturated steam at the highest temperature employed, to prevent vaporization. Sufficient excess water must be supplied to provide that which dissolves in the fatty material at the high temperatures employed, that required for the hydrolysis or saponification, and that required to wash out the glycerin; and the process effects the substantially complete aqueous saponification of the fatty material with the production of a relatively concentrated and pure glycerin.

The present invention provides a new and improved process permitting the aqueous hydrolysis or saponification of fats or fatty oils with the production of relatively concentrated aqueous glycerin and fatty acids uncontaminated by catalysts or other objectionable impurities requiring special treatment for their removal, the new process thus having many of the advantages of the process of my said prior application, but differing therefrom in important respects.

In accordance with the present invention, the saponification or hydrolysis is carried out in two operations, advantageously portions of a single continuous process, the first of which results in the hydrolysis of a substantial proportion of the fatty material, advantageously setting free 80 90% of the fatty acids, by a balanced or equilibrium reaction accomplished by the concurrent heating of the fatty material in contact with water or dilute aqueous glycerin and the second of which involves the substantially complete saponification of the fatty material separated from the aqueous glycerin after the first operation by subjecting the separated and partially saponified fatty material to countercurrent contact with water or with successive portions of water, continuously or intermittently, at a temperature sufficiently high to insure relatively rapid reaction, e. g. temperatures in excess of 200° C., but below the temperature at which a single phase would result with the amount of water taken, that is, below a temperature of about 287° C., and at pressure sufficiently high to prevent the vaporization of the water.

Advantageously, the aqueous liquid used in the first operation is the relatively dilute aqueous glycerin resulting from the final or countercurrent saponification or hydrolysis, as I have found that the balanced or equilibrium reaction which takes place between water and fatty material at high temperatures and pressures in a batch or concurrent flow operation is not materially affected, if instead of water a dilute aqueous glycerin solution, containing, for example, about 15% or less of glycerin, is used. While the presence of this amount of glycerin in the water used for this initial operation may affect the degree of saponification obtained to the extent of reducing the percentage of free fatty acids set free by a small amount, it does not materially affect the operation of the process, and it enables the production of substantially all of the glycerin separated from the fatty material in the form of a relatively concentrated glycerin solution which may contain up to 30% of more glycerin.

I have found, for example, that if, under certain conditions of temperature and pressure, an equilibrium with about 92% of complete saponification is obtained in the presence of a final glycerin solution containing about 15% glycerin, similar material under similar conditions will result in about 87% of complete saponification if an amount of glycerin is present that will give a final glycerin solution in contact with the fatty matter containing about 30% glycerin.

In the initial operation, that is, the operation involving the concurrent contact of the water or dilute aqueous glycerin with the fatty material, it is not necessary to maintain the temperature below that at which a single phase results during the entire operation, but it is important to maintain the temperature sufficiently high, e. g. above about 200° C., to insure a fairly rapid reaction so that the equilibrium is approached within a reasonable time, or so that a substantial degree of hydrolysis is obtained within a reasonable time, and to maintain the temperature of the fatty material and aqueous glycerin substantially below 287° C. when the separation of the fatty material and the aqueous glycerin is carried out so as to insure the presence of an aqueous phase and a fatty phase capable of separation.

An advantageous way of carrying out the initial saponification involves passing dilute aqueous glycerin, containing about 4% of glycerin, for example, concurrently with fatty material in the proportions of about 8 parts by weight of fatty material to 5 parts by weight of the aqueous glycerin through a tube or pipe in which the mixture is heated to a temperature of about 250° C. or somewhat higher under a pressure substantially above the pressure of saturated steam at that temperature and discharging the mixture into a reservoir or quiet zone also maintained at a high temperature and pressure, in which the undissolved water and glycerin separate by subsistence as a glycerin solution containing approximately 15% glycerin. This glycerin solution may be drawn out through a suitable outlet at the bottom of this vessel and separated from the fatty material, which will contain about 90% free fatty acids if the time of contact between the aqueous liquid and the fatty material at the temperature indicated has been about one hour. The aqueous glycerin which is removed at the high temperature contains a few percent of dissolved fatty material, and it is advantageously introduced into another pressure vessel, while the high pressure is maintained, in which it may be cooled to about 100° C. with the result that the dissolved fatty material separates and may be returned to the first vessel. The aqueous glycerin may then be removed from the second pressure vessel through suitable outlets and thus be obtained as a glycerin solution substantially free from fatty material.

The partially saponified fatty material in the first pressure vessel, which may advantageously contain about 90% free fatty acids, is forced out of the top of the vessel by the constant inflow of new fatty material and aqueous glycerin into the bottom of another pressure vessel through which it passes upwardly in countercurrent contact with water under a suitable high temperature and pressure and in which the saponification or hydrolysis is substantially completed, with the result that the fatty material, may be withdrawn from the top of the countercurrent vessel in the form of free fatty acids containing substantially no glycerin and containing no water except that dissolved. By cooling the fatty material before the removal from the countercurrent vessel, as by introducing cold water instead of heated water at the top to effect the countercurrent saponification, the fatty acids which are removed may be obtained substantially free from both glycerin and water, as the solubility of water in the fatty material at temperatures of about 185° C. or lower is very slight.

At the bottom of the countercurrent pressure vessel the aqueous glycerin resulting from the reaction is separated from undissolved fatty material as a solution containing about 4% glycerin, and this solution is advantageously used in the initial saponification by simply pumping it, while maintaining the high pressure, to the initial heating coil, where it is admixed with the fresh fat or fatty oil to be treated.

The initial heating coil, in which the fat or fatty oil and water or aqueous glycerin is first heated to the high temperatures and pressures may advantageously be so heated that the temperature of the material passing through it is somewhat greater than that maintained in the reservoir into which it discharges, which must be kept at a temperature substantially below about 287° C. I have found that the rate of saponification increases rapidly as the temperature is increased, and that by maintaining the temperature of the heating coil somewhat above the temperature of the pressure vessel into which it discharges the rate of saponification can be increased, and the constant discharge of the material, heated to a temperature somewhat in excess of that maintained in the pressure vessel, into the pressure vessel serves to neutralize the heat losses from the pressure vessel and to aid in maintaining its temperature at the desired point.

In this operation as described, it will be seen that the water employed first passes in countercurrent contact with the partially saponified fatty material and then is used for the initial saponification of the fat or fatty oil and is removed as comparatively concentrated glycerin solution after this initial saponification, while the fat or fatty oil is first subjected to an initial saponification by concurrent contact with dilute aqueous glycerin and subsequently, after partial saponification or hydrolysis, to countercurrent contact with fresh water, after which it is obtained as fatty acids containing substantially no combined glycerin. In the operation described, the fat or fatty oil and the water have been indicated to be used in the relative proportions by weight of about 8 to 5, and the glycerin solution finally obtained contains about 15% glycerin, but the proportions of fatty material and water used can be widely varied with the production of glycerin solutions of lower or higher concentrations than indicated, glycerin solutions containing as much as 30% of glycerin or more being readily obtainable.

As has been pointed out, the initial hydrolysis is an equilibrium reaction, involving a time factor for the attainment of a substantial degree of hydrolysis, and advantageously it is carried to substantial equilibrium so that most of the hydrolysis is accomplished in this operation and the size of the vessel required for the final countercurrent hydrolysis may be relatively small, or conversely, the capacity of a given vessel may be relatively high. To provide this time factor, I may provide a pressure vessel of large cubic capacity into which the coil in which the water or dilute aqueous glycerin and fatty material is heated discharges. This pressure vessel should be so constructed that it can be maintained at the high temperature and pressure employed, and should advantageously have a capacity somewhat in excess of the volume of fat that is to be treated during the time that it is necessary for the saponifying action to approach an equilibrium. Thus if 2500 pounds of fat are to be saponified in one hour and the equilbrium is approached in about 50 minutes, which is about the time required if a temperature of about 260° C. is used, it is advantageous to provide a pressure vessel having a size sufficient to hold 2500 pounds of hot fatty material in addition to the water or glycerin solution that is present.

It is not necessary that this reservoir be a separate pressure vessel, as the hot mixture of partially saponified fatty material and glycerin solution may be discharged from the heating coil directly into the bottom of the countercurrent saponifying pressure vessel and the separation of the fatty material from the glycerin solution may be effected in a suitable zone provided in the bottom of this vessel, particularly if the heating coil is quite long and is heated to a relatively high temperature, so that a substantial amount of saponification takes place in it.

The invention will be further illustrated by reference to the attached drawings, which illustrate, in a diagrammatic and conventional fashion, apparatus embodying the invention and adapted for use in carrying out the process of the invention.

Figure 2:
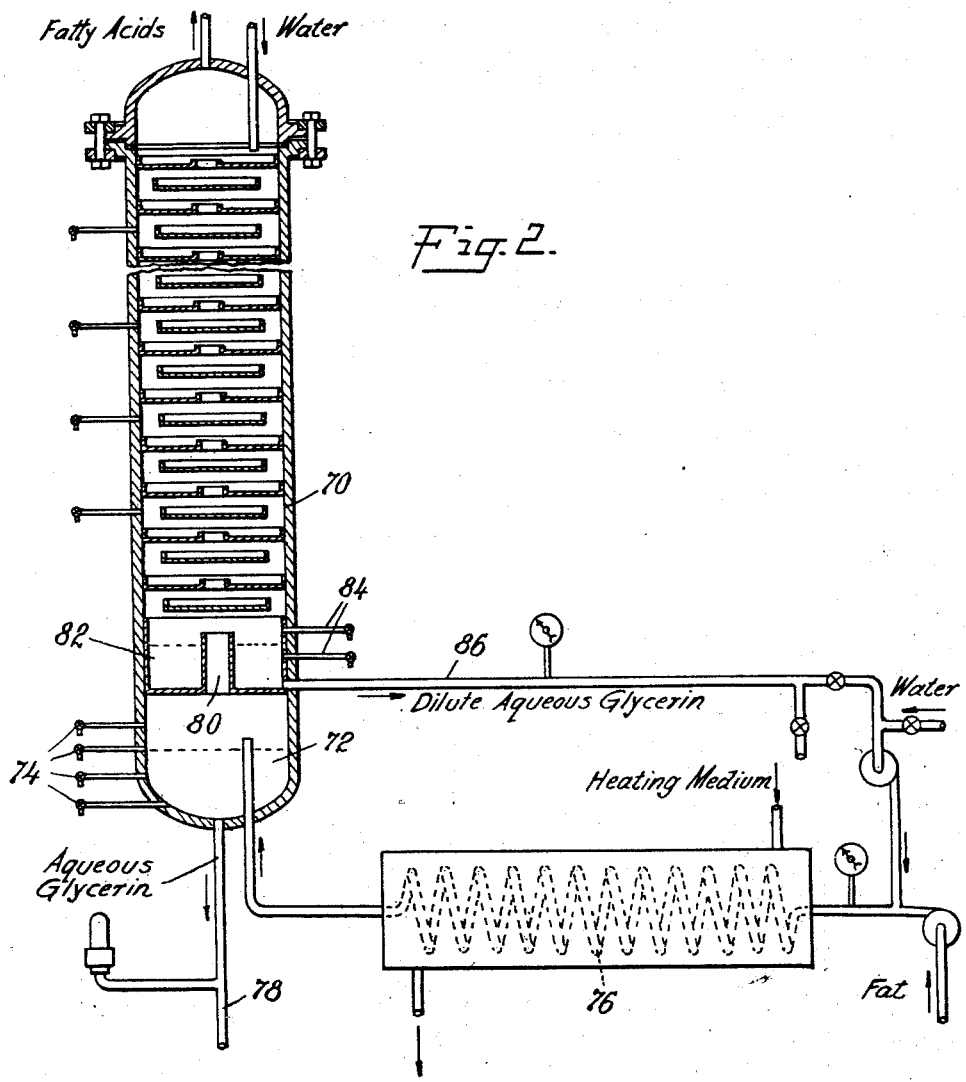

In the drawings,

Fig. 1 illustrates diagrammatically one form of apparatus suitable for carrying out the process of the invention and which embodies the invention provided with a separate reservoir or pressure vessel for providing the necessary time factor in the initial saponification; and Fig. 2 illustrates diagrammatically a modified form of the apparatus which embodies the invention and which is suitable for carrying out the process, in which the zone in which the initial saponification is completed is included within the pressure vessel in which the final countercurrent saponification is carried out.

Figure 3:
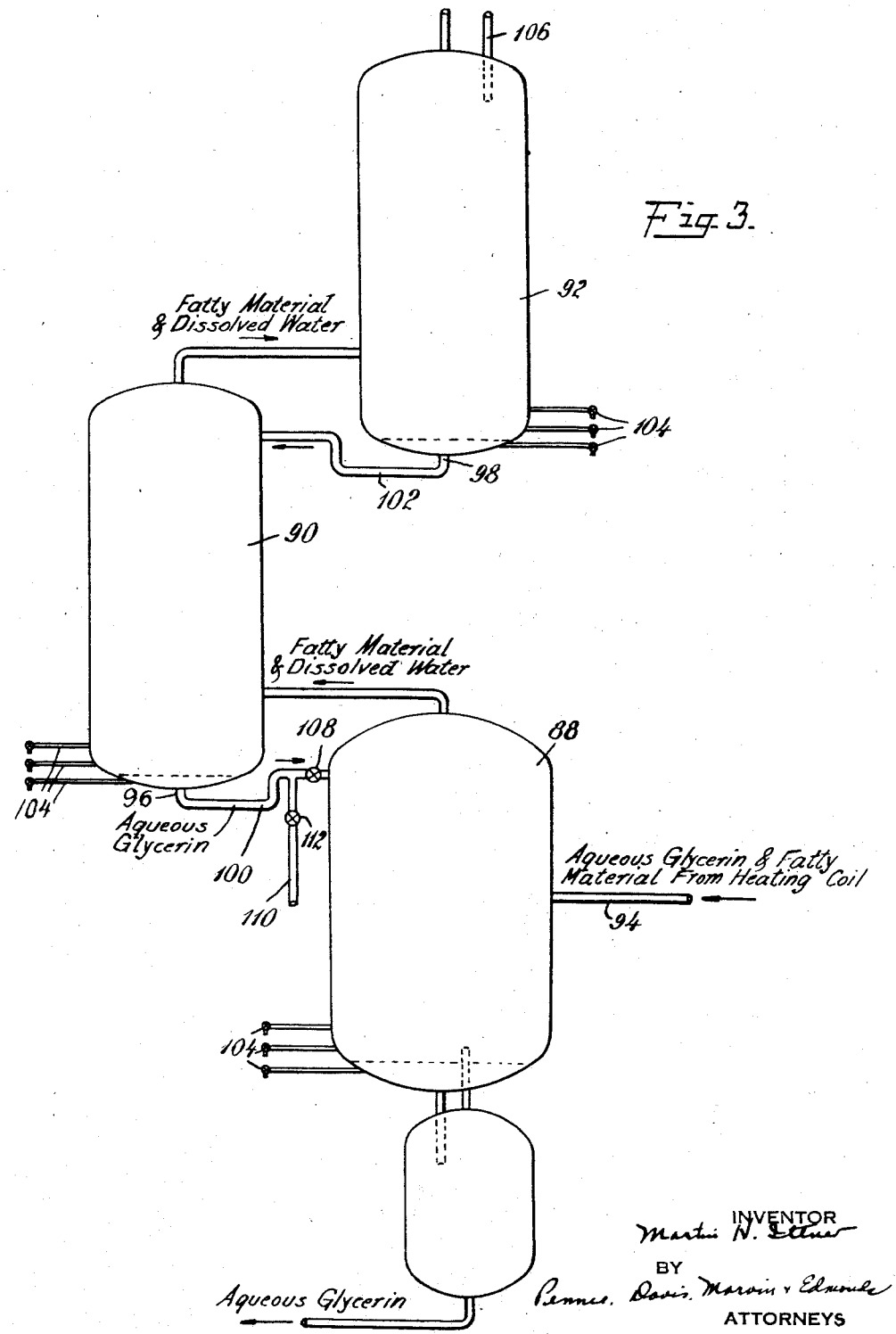

Fig. 3 illustrates diagrammatically a modified form of a portion of the apparatus of Fig. 1.

In Fig. 1 there is shown a heating coil 10 of suitable corrosion and pressure resistant material into which the fatty material to be saponified is introduced through inlet 12 by pump 14 and water or dilute aqueous glycerin through inlet 16 by pump 18. This heating coil is heated by means of diphenyl oxide or other suitable heating medium introduced into the jacket 20 and should be sufficiently long to insure that the material passing through it is heated to the high temperatures used, e. g., it may be made from about 50 feet of suitable tubing. This heating coil discharges through pipe 22 into the pressure vessel 24, also made of a suitable corrosion resistant material, which should be of such a size as to hold a quantity of hot fatty material equal to that to be saponified during the period required for the initial saponification to be carried out to the desired extent, as well as the aqueous glycerin which may be present. For example, if 2500 pounds of fatty material are to be saponified per hour and if the period required for the initial saponification to proceed to the desired extent is about 50 minutes, the capacity of this pressure vessel should be about 2500 pounds of hot fatty material plus the aqueous glycerin which may be present so that the period during which the initial saponification is carried out is somewhat in excess of the 50 minutes required for the approximate equilbrium to be reached.

This pressure vessel is kept substantially full of fatty material, with a small layer of aqueous glycerin at the bottom, and is advantageously provided with petcocks 26 or other suitable indicating means to enable the determination of the position of the interface between the aqueous glycerin and the fatty material. At the bottom of this pressure vessel is provided an outlet 28 through which the aqueous glycerin is withdrawn. This outlet extends downwardly into the interior of another pressure vessel 30, in which the hot aqueous glycerin from the pressure vessel 24 is cooled somewhat while still maintained under the same high pressure so that the dissolved fatty material separates therefrom. This dissolved fatty material rises to the top of the liquid in the pressure vessel 30, and because of its lighter weight, rises upwardly through the pipe 32 which extends from the top of the pressure vessel 30 into the pressure vessel 24 to above the level of the interface between the aqueous glycerin and the fatty material in vessel 24. By providing this means of withdrawing the aqueous glycerin and returning the fatty material dissolved therein to the pressure vessel 24, the aqueous glycerin can be withdrawn from the vessel 30 through the outlet 34 substantially free from both dissolved and undissolved fatty material. The vessel 30 may be provided with petcocks or other suitable devices to enable the withdrawal of samples, to make sure that the material withdrawn is aqueous glycerin, and to enable the adjustment of the rate of withdrawal to avoid the withdrawal of any fatty material.

The vessel 24 is provided at the top with an outlet 38 which discharges somewhat above the bottom of the pressure vessel 40 in which the countercurrent saponification is carried out. By introducing the partially saponified fatty material from the vessel 24 somewhat above the bottom of the vessel 40 there is provided at the bottom of this vessel a settling zone 41 in which the fatty materials may be separated by gravity from the water and aqueous glycerin which flows downwardly through the vessel 40. Petcocks 42 or other suitable devices may be provided to enable the determination of the interface between the fatty material and the aqueous glycerin in this zone of the vessel 40, so that the rate of withdrawal of the aqueous glycerin through the outlet 44 may be adjusted to keep this interface below the point of introduction of fatty material through the pipe 38, the vessel 40 thus being kept substantially full of fatty material except for the water and aqueous glycerin flowing downwardly through it and that in the zone 41 at the bottom.

The interior of the pressure vessel 40 above the settling zone at the bottom is advantageously provided with means to cause the material passing through the vessel to follow labyrinthian paths. One suitable construction is shown in Fig. 1, the parts not being to scale. The vessel 40 may be, for example, about 2 feet in diameter and 15 feet high, for operation in cooperation with a pressure vessel designed to hold about 2500 pounds of hot fatty material, as described above, and made of suitable pressure resistant and corrosion resistant materials, such as stainless steel. It is shown as provided with a series of trays 46 and 48 with the alternate trays 46 having a diameter the same as or somewhat less than the interior diameter of the vessel, and the intermediate trays 48 of smaller diameter, as shown. These trays may be spaced, for example, about one inch apart, more or less, but are shown as proportionately further apart, for convenience of illustration. The trays are suitably supported by rods or other devices (not shown) and are so constructed and arranged as to cause the material to follow labyrinthian paths, to increase the efficiency of the excess liquid water in washing out glycerin from the fatty acids.

The alternate trays 48 are shown as of materially less diameter than the inner diameter of the vessel and as provided with rims at their outer peripheries over which the material flowing downwardly, that is, the aqueous glycerin or water, must flow; while the other trays 46 which are shown as having the same diameter as the inner diameter of the vessel, but which may advantageously have a somewhat smaller diameter to allow for clearance and expansion, are also provided with outer peripherial rims and with openings at the center with somewhat lower rims over which the water or glycerin must flow in its downward path. The fatty material, rising through the vessel, follows a reverse path.

At the top of the vessel 40 there is provided another separating zone 50 for the separation of the outgoing fatty acids from undissolved water or aqueous glycerin. These fatty acids, which are substantially completely saponified after the passage through the vessel 40 are removed from the top thereof through the outlet 52. Water is introduced at a point somewhat below the top of the pressure vessel 40 through the inlet 54, this inlet extending sufficiently far down into the vessel to provide the separating zone at the top. The water which is thus introduced may be either cold or hot, but of course is under a high pressure. If cold water is introduced, the fatty acids which emerge from the vessel are relatively cool, so that they contain little or no dissolved water or glycerin; whereas if water at a high temperature is introduced, the fatty acids which emerge may contain as much as 20% or more dissolved water.

The pressure vessel 40 may be provided at suitable places with petcocks 56 for sampling purposes.

As previously described, the aqueous glycerin removed from the vessel 40 flows out through the pipe 44, and may either be removed from the system through the pipe 58 or may be passed through the pipe 60 and used in the initial saponification of the fatty material, passing through the pipe 16. If this dilute aqueous glycerin is removed through the pipe 58 and used for other purposes, water may be used in the initial saponification, being introduced through the pipe 62. Suitable valves 64 are provided to permit this glycerin solution removed from the vessel 40 to be used in these various ways, it being understood that the system is sufficiently flexible so that part or all of this glycerin solution may be removed through the pipe 58 and part or all of it may be used for the initial saponification, supplemented if desired, by water introduced through the pipe 62.

Suitable gauges 63 for determining the pressure at the various parts of the apparatus are provided, as is a safety valve 65 which may be located on the pipe 44 or in another place as desired. It is to be understood that the entire apparatus, with the possible exception of the vessel 30, is to be suitably and efficiently insulated to conserve heat, and if necessary, suitable external unitary heaters or jackets are to be applied to the various portions of the apparatus to replace heat lost through radiation and to supply heat and control heating. For example, it may be found necessary to provide unitary heaters or a heating jacket around the vessel 40 to insure the maintenance of the necessary high temperature in this vessel, at least toward the bottom and intermediate portions in which substantially all of the final saponification takes place. And this is true particularly where cold water is introduced through the pipe 54, as this cold water must be heated up to the proper reaction temperature, which is above about 200° C., in order to insure the completion of the saponification.

An advantageous method of operating this apparatus consists in introducing fatty material to be saponified through the pipe 12 and simultaneously introducing cold water through the pipe 54, the fatty material and water being used in proportions of about 8 to 5 by weight. After the process has proceeded through the initial stages and is operating normally, dilute aqueous glycerin containing about 4% glycerin is withdrawn from the bottom of the pressure vessel 40 and is introduced through the pipes 44, 60 and 16 and the circulating pump 18 into the heating coil 10 along with the fatty material introduced through the pipe 12 and the pump 14. In this heating coil, the admixed materials are raised in temperature to about 250° C., or advantageously somewhat higher, for example, to about 265° C., under a pressure sufficient to prevent the formation of a vapor phase. After being heated in this coil, the admixed materials are discharged through the pipe 22 into the pressure vessel 24, in which the temperature maintained may advantageously be about 250° C., and is advantageously somewhat below the temperature of the heating coil 10, so as to insure the maintenance of a fatty phase and an aqueous phase in this vessel while at the same time maintaining the solubility of the water in the fatty material at a sufficiently high point to insure that the saponification proceeds with reasonable rapidity. If desired, an agitator may be provided in this vessel 24 to promote the intimacy of contact between the fatty material and the aqueous liquid. One or more insulated pressure vessels similar to 24 may be employed in series with 24 if desired for the purpose of increasing the hot storage of partially saponified fatty material and for the avoidance of short circuiting. These vessels may advantageously be so arranged and so connected that any aqueous glycerin solution separating from the fatty matter due to reduction in temperature and lessened solubility of water in the fatty matter, will flow backward and eventually find its way into the vessel 24 and vessel 30, as hereinafter described in connection with Fig. 3. It will also be noted that in the advantageous operation described, the temperature in the heating coil is above that in the pressure vessel, so that the heat introduced by the highly heated material from the heating coil serves to neutralize the heat loss by radiation from the pressure vessel 24 so that it may be unnecessary to supply additional heat to this vessel. In this pressure vessel, the initial saponification proceeds almost to an equilibrium, and aqueous glycerin separates by subsistence at the bottom of the vessel, the interface between this aqueous liquid and the fatty material being determinable by the petcocks 26 or other suitable devices. The aqueous liquid flows downwardly through the outlet 28 into the vessel 30, the flow being controlled by a valve on the pipe 34 (not shown).

In this vessel, the aqueous glycerin is cooled, advantageously to about 100° C., with the result that the dissolved fatty material, which may amount to about 5% at the high temperature of 250° C., separates and rises to the top of the vessel and then flows upwardly through the pipe 32 and is returned to the pressure vessel 24. The fatty material which is partially saponified and which collects at the top of the pressure vessel 24, nearly filling this vessel, is forced upwardly through the pipe 38, by the incoming fatty material and aqueous liquid, into the pressure vessel 40, which it enters somewhat above the bottom and above the separating zone which is provided there. The partially saponified material then flows upwardly through the pressure vessel 40, following the labyrinthian paths required by the trays or other devices provided in this vessel, thus flowing countercurrently to the water which is introduced through the pipe 54 in the proportions referred to above. The water if not preheated is heated by the upwardly flowing fatty material (this heating may be supplemented by providing a heating jacket or heaters around the exterior of the vessel 40), and a temperature of about 245–250° C. is maintained in this vessel, this temperature being sufficiently high to insure that the fatty material dissolves sufficient water to provide that required for the completion of the saponification, that dissolved in the fatty material, but sufficiently low to insure an aqueous phase of sufficient volume to wash out the glycerin as a dilute aqueous glycerin with the proportions of water and fatty material selected. The water flows downwardly and collects in the zone provided at the bottom of this vessel as dilute aqueous glycerin containing about 4% more or less glycerin, while the fatty material flows to the top of the vessel where it is cooled by the incoming water or otherwise, and where substantially all of the dissolved water separates out, so that the fatty acids removed from the top of the vessel through the pipe 52 are substantially free from dissolved water. Of course, if hot water is introduced through the inlet 54, the fatty acids will not be cooled to such an extent, and when removed will contain considerable proportions of dissolved water.

Using the proportions described, the aqueous glycerin which is finally removed from the vessel 30 will contain 15 to 20% of glycerin, depending upon the nature of the fatty material used; if tallow be the fatty material, for example, the aqueous glycerin will contain about 15% glycerin, whereas if cocoanut oil is used, the aqueous glycerin will contain a somewhat higher percentage of glycerin. These proportions of fatty material and water, that is, 8 parts of fatty material to 5 parts of water, are advantageous, but they may be varied widely. In general, the amount of water, in the aqueous glycerin or as water, used in the initial concurrent saponification should be in excess of about 10% of the weight of the fatty material, and advantageously is in excess of about 30% of the weight of the fatty material. Good results are obtained when the final glycerin solution contains around 15% glycerin, but by using less water, more concentrated solutions are readily obtained, and by using more water, more dilute solutions may be obtained.

It will be noted that throughout the entire operation, the pressure maintained upon the liquid is approximately the same, and this pressure should be sufficiently high to prevent any vaporization with the highest temperatures employed in the process, which ordinarily are the temperatures in the heating coil 10, in which relatively high temperatures may be used, as it is not necessary that separate fatty and aqueous phases be maintained in the heating coil, as the saponification proceeds so long as the temperature is sufficiently high to insure a substantially high solubility of the water in the fatty material, whether the water and fatty material be present in two phases, or whether the temperature be sufficiently high so that the two phases merge into a single phase. It is important, of course, that the temperature in the pressure vessel 24 be substantially below that at which a single phase is formed, so that separation of the aqueous glycerin from the fatty material can take place, a temperature of from 200 to about 250° C., or even a little higher, in this vessel being advantageous. Similarly, it is important that the temperature in the countercurrent pressure vessel 40 be maintained well below the temperature at which a single phase is formed, so that the countercurrent flow of the water or aqueous glycerin and fatty material can take place, temperatures ranging from 200° C. up to about 250° C. or a little higher in this vessel being advantageous. The temperatures which may be used in the pressure vessel 24 and the countercurrent vessel 40 may be varied quite widely within the ranges described above, the higher temperatures giving increased rates of saponification due largely to increased solubility of the water in the fatty material, but at the same time requiring the use of somewhat more water to provide that needed to wash the glycerin from the fatty material after saponification. Even lower temperatures, e. g., temperatures ranging down to about 185° C. may be used in various parts of the apparatus, but at such lower temperatures the reaction is quite slow, and the capacity of the apparatus is greatly decreased.

In Fig. 2 there is illustrated a modified form of apparatus which is also suitable for carrying out the process. In this form of apparatus, instead of providing a separate pressure vessel into which the heating coil in which the water and fatty material is initially heated discharges, the heating coil discharges into the bottom of a large pressure vessel 70 somewhat above the bottom thereof, into the zone 72, which thus forms a reservoir more or less comparable to the pressure vessel 24 of the apparatus of Fig. 1. Suitable petcocks or other devices 74 are provided here to permit the determination of the interface between the fatty material and the aqueous glycerin. In this form of apparatus it is advantageous to have the heating coil 76 somewhat longer than that of the apparatus of Fig. 1, so that the period of contact between the water and the fatty material in this heating coil is somewhat longer, and the saponification proceeds to a considerable extent in the heating coil before the material is discharged into the zone 72.

The aqueous glycerin which separates from the fatty material in the zone 72 is removed through the outlet 78, the fatty material flowing upwardly through the tube 80 into the tray 82, which is quite deep, e. g. about 12 or 18 inches deep, and which serves as a separating zone for the aqueous glycerin or water flowing downwardly through the vessel 70 from the top and the fatty material flowing upwardly through the tube 80. This zone or tray is also provided with petcocks 84 or other suitable devices for determining the position of the interface between the aqueous glycerin and the fatty material therein, and the aqueous glycerin, which is the dilute glycerin solution resulting from the final countercurrent saponification of the fatty material, is removed through the outlet 86. The upper portion of the vessel 70 may be provided with trays and is provided with a separating zone at the top and with an outlet for fatty acids and an inlet for water with much the same construction as the upper portions of the vessel 40 illustrated in Fig. 1.

The operation of the apparatus of Fig. 2 is similar to that of Fig. 1, the dilute aqueous glycerin from the countercurrent saponification of the partially saponified fatty material being advantageously used for the initial saponification of the fatty material, both the aqueous glycerin from the countercurrent operation and the fatty material being introduced into the heating coil 76, where the mixture is heated and the saponification is initiated. The temperatures maintained throughout this operation, and the pressures used, are much the same as those required in the operation of the apparatus of Fig. 1, it being understood that the temperature within the zone 72 and the temperature within the rest of the vessel 70 are maintained substantially below the temperature at which a single phase occurs, but sufficiently high to insure that the solubility of the water in the fatty material is great enough to effect rapid saponification. In the vessel 70 temperatures ranging from 200° C. to 250° C. or somewhat higher are advantageous, while the temperatures in the heating coil 76 may advantageously be somewhat higher, e. g. up to 265° C. or even higher, as it is not necessary to maintain separate phases within this heating coil.

All of the apparatus, of course, should be efficiently insulated to prevent loss of heat, and the vessel 70 may be provided with exterior unitary heaters suitably disposed to supply the heat which may be lost by radiation and for controlling the heating; or, if desired, the entire vessel 70 may be jacketed and its temperature controlled by means of diphenyl oxide, high pressure steam, or other suitable heating medium.

In the operation of this apparatus, as in the operation of the apparatus of Fig. 1, cold water may be introduced at the top, with the result that the fatty acids removed are substantially free from dissolved water, the water being heated by contact with the hot fatty material, and by heat supplied to the vessel.

In Fig. 3, there is illustrated a modification of a portion of the apparatus of Fig. 1. In this form of apparatus, instead of a single pressure vessel 24 for the completion of the initial saponification, there is provided a plurality of vessels 88, 90 and 92 (in the apparatus shown there are three of these vessels, but of course, the number may be varied) in series. The heating coil 60 discharges through pipe 94 into the first of these vessels, which may be of construction similar to that of the vessel 24 of Fig. 1, and a separation of aqueous glycerin and fatty material occurs in this vessel, as described above. The fatty material flowing from the top of this vessel, however, instead of entering a vessel for countercurrent treatment, as in the apparatus of Fig. 1, enters another similar vessel 90, advantageously somewhat smaller, at the side. In this vessel, a continuation of the saponification and a similar separation of aqueous glycerin may take place, the aqueous glycerin being drawn off through outlet 96 and carried back to the first vessel. The fatty material from the top of this vessel then enters the third vessel 92 at the side and the process is repeated in this vessel. The fatty material is finally removed from the top of the third vessel and is led to a vessel similar to vessel 40 of Fig. 1 for the completion of the saponification. The aqueous glycerin return lines 96 and 98 are provided with traps 100 and 102 to prevent circulation of fatty material through them.

Such an arrangement of pressure vessels avoids any short circuiting of the fatty materials and aqueous glycerin, such as might occur in the apparatus of Fig. 1 and insures an ample period of contact between the fatty material and the water or aqueous glycerin in the initial saponification.

Each of the pressure vessels 88, 90 and 92 are advantageously provided with petcocks 104 or other suitable indicating means at the sides to permit determination of the position of the interface between the fatty material and the aqueous glycerin, and all of the vessels should be efficiently insulated to minimize loss of heat. The vessels may be jacketed or provided with unitary heaters to supply heat lost by radiation and to control the heating of the vessels.

Instead of operating in the manner just described, the third pressure vessel may be provided at the top with an inlet 106, through which hot or cold water may be introduced continuously or intermittently so that the saponification of the fatty material may be completed without resort to a vessel similar to the vessel 40 of Fig. 1 for final countercurrent saponification. In such case, the valve 108 in line 96 is closed, so that the aqueous glycerin from the pressure vessel 90 does not flow back into the pressure vessel 88 and the aqueous glycerin from the vessel 90 is withdrawn through the outlet 110 controlled by the valve 112. The aqueous glycerin so removed is advantageously introduced into the initial heating coil (not shown in this figure), along with the fatty material to be saponified.

In the initial part of my process, the saponification is not a complete saponification of some of the triglyceride molecules leaving the other triglyceride molecules unsaponified, but rather is to a large extent a partial saponification of some of the triglyceride molecules, first into fatty acids and diglycerides along with remaining triglycerides, the amount of diglycerides present gradually increasing while the amount of triglycerides decreases. As the saponification proceeds, and with higher percentages of fatty acids set free from the fatty molecules, there is a simultaneous formation of monoglycerides by the further saponification of diglycerides, and the proportion of the unsaponified matter remaining as monoglycerides after substantially 60% saponification has been reached is very large. It may thus be readily understood that the final portion of my process, following as it does a very substantial degree of saponification which leaves a high percentage of monoglycerides in the partially saponified fatty material, with corresponding lower amounts of diglycerides and triglycerides, is substantially different from other types of saponification that have been described and which employ triglycerides as fatty materials.

It has been found that monoglycerides, unlike triglycerides, have a strong tendency to emulsify with aqueous liquids and for this reason I find it important to provide means, such as hereinbefore described, for separating partial emulsions at the points where aqueous glycerin solutions and fatty acids are withdrawn from contact with one another, as well as means to minimize emulsion of the aqueous and fatty phases.

I have described the operation as a continuous process, with water and fatty material coninuously introduced into the apparatus in proper amounts, and proper proportions; and I prefer to operate the process in such continuous manner. Nevertheless, the process and apparatus may be operated in an intermittent or semi-continuous manner, with intermittent or alternate introduction of water and fatty matreial, within the scope of my invention in its broader aspects. Also, while I have described the invention as one involving the hydrolysis of fats and fatty oils by the use of liquid water alone, at high temperatures and pressures, it should be understood that if desired, and if unobjectionable, suitable catalysts may be used to speed up the hydrolysis.

I claim:

1. The method of hydrolyzing fats and oils which comprises concurrently heating the fatty material with liquid water to temperatures in excess of about 185° C. for a sufficient length of time to effect a substantial degree of hydrolysis, thereafter maintaining the temperature so that it is above 185° C. but substantially below about 287° C., separating the resulting aqueous glycerin from the fatty material, and completing the hydrolysis of the fatty material by bringing it into contact with successive portions of liquid water at temperatures above about 200° C. but below the temperature at which a single phase is formed at a pressure substantially above the pressure of saturated steam at the highest temperature employed, while minimizing emulsification of said fatty material with said successive portions of liquid water with which it is brought into contact.

2. The process of hydrolyzing fats and oils which comprises bringing the fatty material and aqueous glycerin to substantial equilibrium at a temperature above about 200° C. and substantially below 287° C. at a pressure sufficient to keep the water in a liquid phase, separating the resulting aqueous glycerin from the fatty material and completing the hydrolysis of the fatty material by bringing it into contact with successive portions of liquid water at temperatures above about 200° C. but below the temperature at which a single phase is formed and at a pressure substantially above the pressure of saturated steam at the highest temperature employed, while minimizing emulsification of said fatty material with said successive portions of liquid water with which it is brought into contact.

3. The method of hydrolyzing fats and oils which comprises concurrently heating the fatty material with liquid water to temperatures in excess of about 185° C. for a sufficient length of time to effect a substantial degree of hydrolysis, thereafter maintaining the temperature so that it is above 185° C. but substantially below about 287° C., separating the resulting aqueous glycerin from the fatty material, and completing the hydrolysis of the fatty material by bringing it into countercurrent contact with liquid water at temperatures above about 200° C. but below the temperature at which a single phase is formed and at a pressure substantially above the pressure of saturated steam at the highest temperature employed in said countercurrent operation.

4. The process of hydrolyzing fats and oils which comprises bringing the fatty material and aqueous glycerin to substantial equilibrium at a temperature above about 200° C. and substantially below 287° C. at a pressure sufficient to keep the water in a liquid phase, separating the resulting aqueous glycerin from the fatty material and completing the hydrolysis of the fatty material by bringing it into countercurrent contact with water at a temperature above 200° C. but below the temperature at which the water and the fatty material form a single phase, and at a pressure substantially above the pressure of saturated steam at the highest temperature employed in said countercurrent operation.

5. The process as in claim 4, in which the dilute aqueous glycerin obtained from the countercurrent hydrolysis is used to effect the initial hydrolysis of the fat or oil.

6. The process of hydrolyzing fats and oils which comprises heating a fatty material and dilute aqueous glycerin in intimate concurrent contact with each other to a temperature sufficiently high, and for a period sufficiently long, to effect a substantial degree of hydrolysis while maintaining a pressure sufficient to prevent vaporization of water, separating the resulting aqueous glycerin from the fatty material while maintaining the temperature substantially below 287° C. and while maintaining the high pressure, and completing the hydrolysis of the fatty material by bringing it into intimate contact with successive portions of water at a temperature above about 200° C. but substantially below about 287° C. and under a pressure sufficient to prevent vaporization of the water.

7. The process of hydrolyzing fats and oils which comprises heating a fatty material and dilute aqueous glycerin in intimate concurrent contact with each other to a temperature sufficiently high, and for a period sufficiently long, to effect a substantial degree of hydrolysis while maintaining a pressure sufficient to prevent vaporization of water, separating the resulting aqueous glycerin from the fatty material while maintaining the temperature substantially below 287° C. and while maintaining the high pressure, and completing the hydrolysis of the fatty material by bringing it into intimate contact with water by countercurrent flow at a temperature above about 200° C. but substantially below about 287° C. and under a pressure sufficient to prevent vaporization of the water.

8. The process as in claim 7 in which the aqueous glycerin used for the initial hydrolysis is that resulting from the countercurrent hydrolysis.

9. The process of hydrolyzing fatty materials which comprises concurrently heating the fatty materials with dilute aqueous glycerin containing not more than about 15% glycerin to a sufficiently high temperature and for a sufficiently long period of time to effect a substantial degree of hydrolysis, separating the resulting glycerin solution from the fatty matter at a temperature substantially below 287° C. and subjecting the fatty matter to a further hydrolysis by bringing it into contact with successive portions of liquid water at a pressure substantially in excess of the pressure of saturated steam at the highest temperature employed and at a temperature above about 200° C. but below the temperature at which a single phase would result.

10. The process of hydrolyzing fatty materials which comprises concurrently heating the fatty materials with dilute aqueous glycerin containing not more than about 15% glycerin to a sufficiently high temperature and for a sufficiently long period of time to effect a substantial degree of hydrolysis, separating the resulting glycerin solution from the fatty matter at a temperature substantially below 287° C. and subjecting the fatty matter to a further hydrolysis by bringing it into countercurrent contact with liquid water at a pressure substantially in excess of the pressure of saturated steam at the highest temperature employed and at a temperature above about 200° C. but below the temperature at which a single phase would result.

11. The process as in claim 10 in which the initial hydrolysis is continued for a length of time such that the fatty material after this initial hydrolysis contains at least 80% free fatty acids.

12. A method for the aqueous saponification of fatty material which comprises concurrently heating the fatty material and liquid water in contact with one another, under sufficient pressure to prevent the vaporization of water, said water being employed in amounts in excess of 10% of the weight of fatty material, to temperatures in excess of about 185° C. until a substantial degree of saponification is effected, separating the resulting aqueous glycerin solution from the fatty material at a temperature substantially below about 287° C. while maintaining the high pressure, and subjecting the fatty material thus separated to contact with successive portions of liquid water at a temperature substantially below about 287° C. whereby a further saponification of the fatty material is effected.

13. A method for the aqueous saponification of fatty material which comprises concurrently heating the fatty material and liquid water in contact with one another, under sufficient pressure to prevent the vaporization of water, said water being employed in amounts in excess of 10% of the weight of fatty material, to temperatures in excess of about 185° C. until a substantial degree of saponification is effected, separating the resulting aqueous glycerin solution from the fatty material at a temperature substantially below about 287° C. while maintaining the high pressure, and subjecting the fatty material thus separated to countercurrent contact with liquid water at a temperature substantially below about 287° C. whereby a further saponification of the fatty material is effected.

14. The method for the hydrolysis of fatty material which comprises concurrently heating the fatty material and dilute aqueous glycerin in contact with one another, under pressure, the amount of water in the aqueous glycerin being at least 10% of the weight of the fatty material taken, until a substantial degree of hydrolysis is effected, separating the resulting aqueous glycerin solution from the fatty material at a temperature substantially below about 287° C. while maintaining the high pressure, and subjecting the fatty material thus separated to countercurrent contact with liquid water at a temperature substantially below about 287° C. whereby a further hydrolysis of the fatty materials is effected.

15. The process as in claim 13 when carried out continuously under pressure.

16. The process as in claim 14 when carried out continuously under pressure.

17. The method for the hydrolysis of fatty material which comprises concurrently heating the fatty material and dilute aqueous glycerin in contact with one another, under pressure, the weight of water in said aqueous glycerin being at least 10% of the weight of the fatty material taken, and the concentration of glycerin being below about 15%, to a sufficiently high temperature and for a sufficient length of time to effect a substantial degree of hydrolysis, separating the resulting aqueous glycerin from the fatty material at a temperature substantially below about 287° C., and bringing the separated fatty material into countercurrent contact with liquid water at a temperature substantially below about 287° C. and under a high pressure substantially in excess of the pressure of saturated steam at the temperature selected, whereby further hydrolysis is effected.

18. The process as in claim 17 when carried out continuously under pressure.

19. The process as in claim 14 in which the aqueous glycerin resulting from the countercurrent contact of the fatty material with liquid water is employed as the aqueous glycerin used for the initial hydrolysis of the fatty material.

20. The process as in claim 14 in which the amount of water in the aqueous glycerin employed in the initial hydrolysis is in excess of 30% of the weight of the fatty material taken, and the amount of glycerin in said solution does not exceed about 15%, and in which this aqueous glycerin is that resulting from the countercurrent contact of the partially hydrolyzed fatty material with liquid water.

21. The process as in claim 14 in which the initial hydrolysis is carried out to an extent such that the separated fatty material contains at least 50% free fatty acids.

22. The process as in claim 14 in which the initial hydrolysis is carried out to an extent such that the separated fatty material contains at least 80% free fatty acids.

23. The process as in claim 14 in which the initial hydrolysis is carried out to an extent such that the separated fatty material contains at least 90% free fatty acids.

24. The process as in claim 14 in which the initial hydrolysis is carried out to an extent such that the non-hydrolyzed portion of the fatty material separated from said initial hydrolysis consists largely of monoglycerides.

25. In the aqueous saponification of fats and oils at high temperatures and pressures, the steps which include heating the fatty material in contact with water to a high temperature for a sufficient length of time to effect a substantial degree of saponification, separating the resulting aqueous glycerin from the fatty material at a temperature substantially below 287° C. while maintaining the high pressure, and cooling the aqueous glycerin to effect the separation of dissolved fatty material therefrom while maintaining the high pressure, whereby aqueous glycerin substantially free from fatty material is obtained.

26. In the continuous hydrolysis of fats and oils by concurrent heating of the fat or oil and water or aqueous glycerin in contact with one another under sufficient pressure to prevent vaporization of the water, the steps of separating the glycerin solution formed from the fatty material at a temperature substantially under 287° C. while maintaining the high pressure and cooling the separated glycerin solution to a temperature substantially below the temperature of the greater part of the fatty matter to effect the separation therefrom of dissolved fatty material before releasing the pressure from said separated glycerin solution.

MARTIN H. ITTNER.

CERTIFICATE OF CORRECTION.

Patent No. 2,221,799. November 19, 1940.

MARTIN H. ITTNER.

It is hereby certified that error appears in the printed specification of the above numbered patent requiring correction as follows: Page 1, first column, lines 27 and 28, strike out the words "is used but in which the saponification or hydrolysis"; and second column, line 52-53, for "solbility" read --solubility--; page 2, first column, line 31, before "90%" insert --to--; line 57, after the syllable "ed" strike out the comma; line 70, for "30% of" read --30% or--; same page, second column, line 67, after "material" strike out the comma; page 5, first column, line 31, after "C." strike out the comma; page 7, second column, line 5-6, for "coninuously" read --continuously--; line 12, for "matreial" read --material--; line 35, claim 1, after "formed" insert --and--; page 8, second column, line 66, claim 14, for the word "materials" read --material--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.